United States Patent
Thometschek et al.

(10) Patent No.: US 6,282,751 B1
(45) Date of Patent: Sep. 4, 2001

(54) HINGE CONNECTION FOR A CONTAINER OF A BREATHING GAS SUPPLY UNIT IN AN AIRPLANE

(75) Inventors: Roderich Thometschek, Stockelsdorf; Carsten Mantey, Wulfsfelde; Ralf Göke, Lübeck, all of (DE)

(73) Assignee: Drager Aerospace GmbH (DE)

( * ) Notice: Subject to any disclaimer, the term of this patent is extended or adjusted under 35 U.S.C. 154(b) by 0 days.

(21) Appl. No.: 09/326,264

(22) Filed: Jun. 7, 1999

(30) Foreign Application Priority Data

Dec. 23, 1998 (DE) ................................ 198 59 671

(51) Int. Cl.⁷ ........................................... E05D 7/10
(52) U.S. Cl. .................................. 16/254; 16/267
(58) Field of Search ................ 16/254, 267, 261–263, 16/266, 355, 374, 386, 387; 128/204.18, 206.27; 248/225.21; 220/337, 338

(56) References Cited

U.S. PATENT DOCUMENTS

| 3,126,120 | * | 3/1964 | Crate | 220/343 |
| 5,358,139 | * | 10/1994 | Schnoor et al. | 220/669 |
| 5,598,997 | * | 2/1997 | Marquardt | 248/225.21 |
| 5,816,244 | * | 10/1998 | Aulgur | 128/206.27 |

FOREIGN PATENT DOCUMENTS

| 41 40 266 C1 | | 3/1993 | (DE) . | |
| 2389748 | * | 1/1979 | (FR) | 16/267 |
| 2621066 | * | 3/1989 | (FR) | 16/254 |
| 1319594 | * | 6/1973 | (GB) | 16/254 |
| 403183883A | * | 8/1991 | (JP) | 18/267 |

* cited by examiner

*Primary Examiner*—Chuck Y. Mah
(74) *Attorney, Agent, or Firm*—McGlew and Tuttle, P.C.

(57) ABSTRACT

A hinge connection at a breathing gas supply unit between a container lower part (3) and a container door (4), which is fastened, pivotably around an axis, at a rear container edge (1) of the container lower part (3). The connection is provided such that dimensional differences of the container lower part can have only a limited effect on the positioning of the container door in relation to adjacent components of the breathing gas supply unit. The axis of the hinge is designed as projections (15) located at a spaced location from hinge pins (14) of a rail section (2) in the manner of a pin.

20 Claims, 3 Drawing Sheets

US 6,282,751 B1

HINGE CONNECTION FOR A CONTAINER OF A BREATHING GAS SUPPLY UNIT IN AN AIRPLANE

FIELD OF THE INVENTION

The present invention pertains to a hinge connection provided at a container of a breathing gas supply unit in an airplane between a container lower part and a container door, which door is fastened pivotably around an axis, at a rear container edge of the container lower part, with a rail section located at the rear container edge wherein individual clamps with hinge pins and insertion openings are made in one piece with the long side of rail section and are arranged such that the hinge pins can be inserted into tongues at the rear container edge and can be pivoted along an axially extending hinge axis.

BACKGROUND OF THE INVENTION

A breathing gas supply unit for mounting in an airplane has become known from DE 41 40 266 C1. Such breathing gas supply units are arranged in ceiling structures in the passenger compartment of airplanes and are used to supply the passengers with the oxygen needed for breathing in the case of need. The container of the breathing gas supply unit comprises a container lower part, in which a plurality of oxygen masks and an oxygen generator are arranged, and a container door, which is pivotable around an axis and is used to close the container.

Rail sections, which extend in parallel to the pivot axis of the container door and with which the complete breathing gas supply unit can be fastened in a bracket in the ceiling structure of the airplane, are arranged at the front and rear edges of the lower part of the container. The rail sections are used to simplify the mounting of the breathing gas supply unit in the ceiling structure, on the one hand, and, on the other hand, they also facilitate the removal because the complete breathing gas supply unit can be removed from the ceiling structure without tools. Other components in the ceiling structure, hereinafter called panel, are also fastened with rail sections and are arranged directly next to the breathing gas supply unit. Based on the manufacturing and mounting tolerances, a certain height offset between the breathing gas supply unit, and here especially the container door, and adjacent panels is always possible. Since the container door directly adjoins adjacent panels, any dimensional difference impairs the overall optical impression made by the interior space of the airplane. Possible dimensional differences must be eliminated by adjusting the lower part of the container in relation to the container door, which causes high costs.

SUMMARY AND OBJECTS OF THE INVENTION

The primary object of the present invention is to improve the connection of the container door to the lower part of the container such that dimensional differences of the lower part of the container will have only a limited effect on the positioning of the container door in relation to adjacent panels.

According to the invention, a hinge connection is provided at a container of a breathing gas supply unit in an airplane between a container lower part and a container door. The container door is fastened pivotably around an axis, at a rear container edge of the container lower part. A rail section is located at the rear container edge wherein individual clamps with hinge pins and insertion openings are made in one piece with the long side of the rail section and are arranged such that the hinge pins can be inserted into tongues at the rear container edge and can be pivoted along an axially extending hinge axis. The axis is designed as a projection, which is located at a spaced location from at least one of the said hinge pins in the manner of a pin. The projection extends flush with the hinge axis.

The advantage of the present invention is essentially that by arranging the container door directly at the rail section, the hinge pins of the rail section are inserted into straps at the rear edge of the lower part of the container, the tolerance chain is substantially shortened, because both the container door for the breathing gas supply unit and adjacent panels are fastened to the ceiling support structure by means of the rail sections, and the lower part of the container is therefore no longer in the tolerance chain. Compared with this, the container door was connected directly to the lower part of the container by means of projecting folds in the prior-art design, so that the container door was fastened to the rail section via the lower part of the container. Even though the lower part of the container may still have a certain offset in relation to the container door in the solution according to the present invention, this no longer affects possible tolerances between the container door and adjacent panels. The container door in the solution according to the present invention is connected to the rear edge of the container via pin-like projections, which extend flush with the hinge pins of the rail section. Since the lower part of the container is made as a one-piece molding together with the straps receiving the hinge pins, there are mostly only tolerances linked with the tool, which can be monitored by random checking.

Mounting is also simplified due to the connection according to the present invention between the lower part of the container and the container door via the rail section, because the rail section can be used both to fasten the entire container in the ceiling structure and to connect the container door to the lower part of the container in an articulated manner.

It is especially advantageous to provide the projections also between adjacent clamps on the rail section and to arrange a gap for introducing the hinge elements located at the container door between opposite projections. These hinge elements are arranged along the door edge at approximately equally spaced locations such that they can be connected to the projections. By arranging the hinge elements along the rear edge of the door, holes are no longer needed at the lateral edges of the door for the projections of the rail section.

To simplify mounting, it is especially advantageous for the inner width of the clamps and the width of the corresponding tongues to be selected to be such that the rail section is axially displaceable in relation to the rear edge of the container, so that the projections can be introduced by axial displacement of the rail section into holes located at the door of the container and at the hinge elements.

It is especially advantageous to arrange the hinge elements at a hinge strip extending along the door of the container, so that they can be connected to the door of the container in one operation.

It is especially advantageous to provide the hinge pins with a flattened area at least in the area of overlap with the tongues, which said flattened areas substantially simplify the introduction of the hinge pins into the tongues because of the reduction in cross section.

To axially fix the rail section in relation to the door of the container, an elastic locking element, which engages the rail section in the area of the hinge pin, is provided on the inside of the door of the container. It is especially advantageous to make the locking elements in one piece with the hinge strips.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
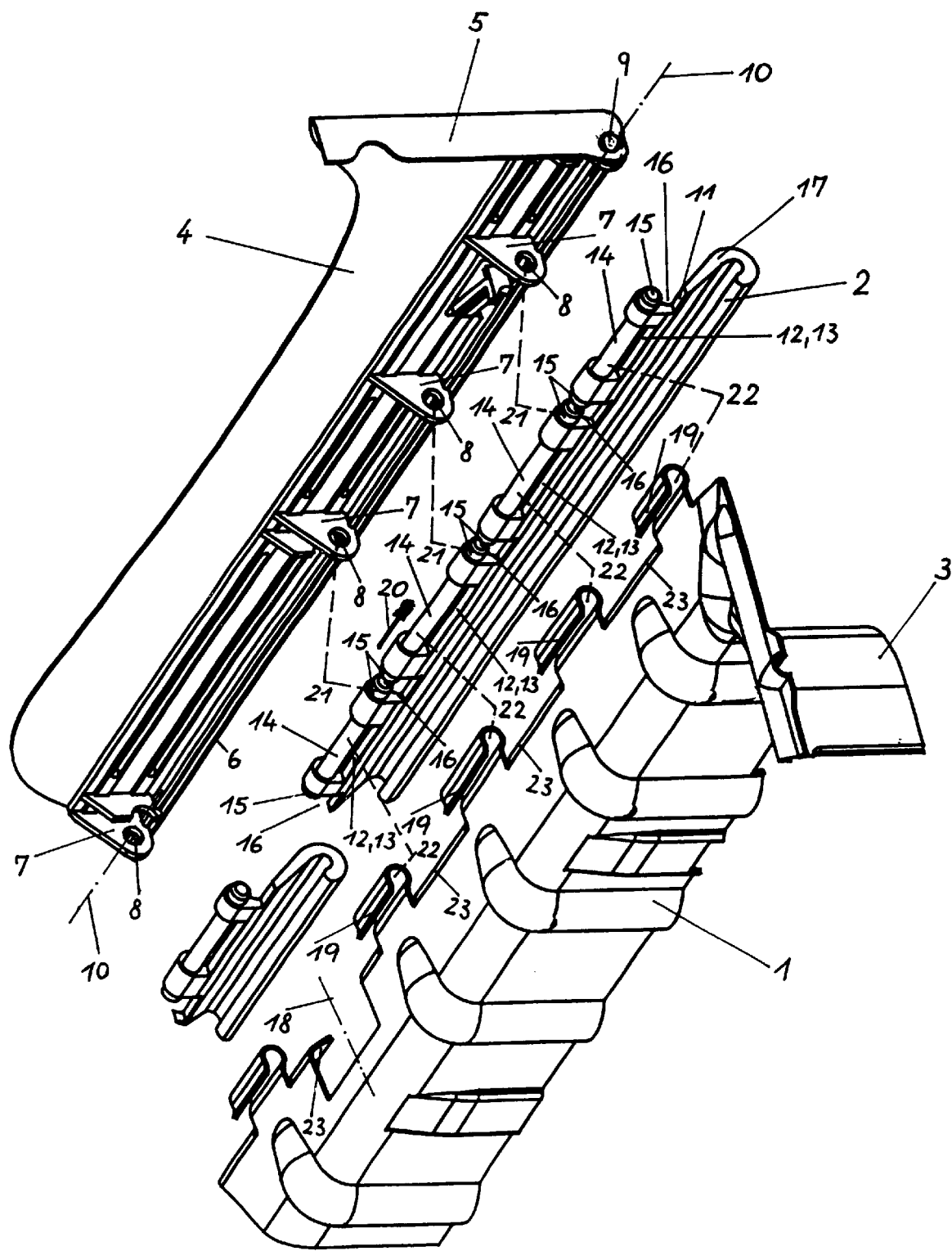
FIG. 1 is a partially schematic exploded perspective view of a hinge connection between the lower part of a container and the door of a container according to the invention.

Referring to the drawings in particular, FIG. 1 schematically shows the right-hand part of a rear container edge 1 of a container lower part 3, which is shown as a detail, a rail section 2 and a detail of a container door 4, which can be connected to the rail section 2 and has an all-around door edge 5, 6. Extending along a rear door edge 6, individual hinge elements 7 are arranged on the inside of the door of the container, which are provided with a hole 8 each. Another hole 9, which is arranged along a hinge axis 10 flush with the holes 8, is located in the door edge 5. Only the right-hand partial section of the container door 4 is shown in FIG. 1. Additional hinge elements 7 as well as a corresponding hole 9 are located in a left-hand partial section of the container door 4, not shown in FIG. 1.

The rail section 2, which is shown as a top view in FIG. 1, has individual clamps 12 made in one piece with the long side 11 of the rail section 2 with an insertion opening 13 and a hinge pin 14 each. Projections 15, forming continuations of the hinge pins 14, are arranged in pairs with one another between the clamps 12 with an insertion opening 16 between them. The diameters of the projections 15 are selected to be such that they can be introduced into the holes 8, 9. The outer side parts 17 of the rail section 2 are symmetric and likewise have projections 15 and insertion gaps 16.

A left-hand partial section of the rear container edge 1, which is not completely shown in FIG. 1, is made equivalently to the right-hand partial section shown in FIG. 1 relative to an axis of symmetry 18, so that the rail section 2 may also be used at the left-hand partial section of the rear container edge 1 because of its symmetry at the outer side parts 17. Individual tongues 19 are made in one piece with the rear container edge 1. Individual tongues 19 have an internal diameter selected to be such that the hinge pins 14 can be introduced into the tongues 19 via the insertion openings 13 and can be pivoted in same. The width of the individual tongues 19 is smaller than the inner width of the insertion openings 13, so that the rail section 2 can be axially displaced in relation to the rear container edge 1. The axial displaceability of the rail section 2 approximately corresponds to the axial length of the projections 15, which will be explained in greater detail below.

The rear container edge 1 is connected to the rail section 2 and the container door 4 such that the rail section 2 is first inserted into the tongues 19 via the insertion openings 13. The rail section 2 is then displaced to the left stop due to its axial displaceability and the holes 8 of the hinge elements 7 located at the container door 4 and the hole 9 at the door edge 5 are then aligned flush with the projections 15. The rail section 2 is subsequently pushed back in the direction of the arrow 20, so that the projections 15 engage the holes 8, 9. For the sake of greater clarity, cooperating holes 8, 9 and projections 15, as well as hinge pins 14 and tongues 19 are indicated by broken lines in FIG. 1.

Figure 3:
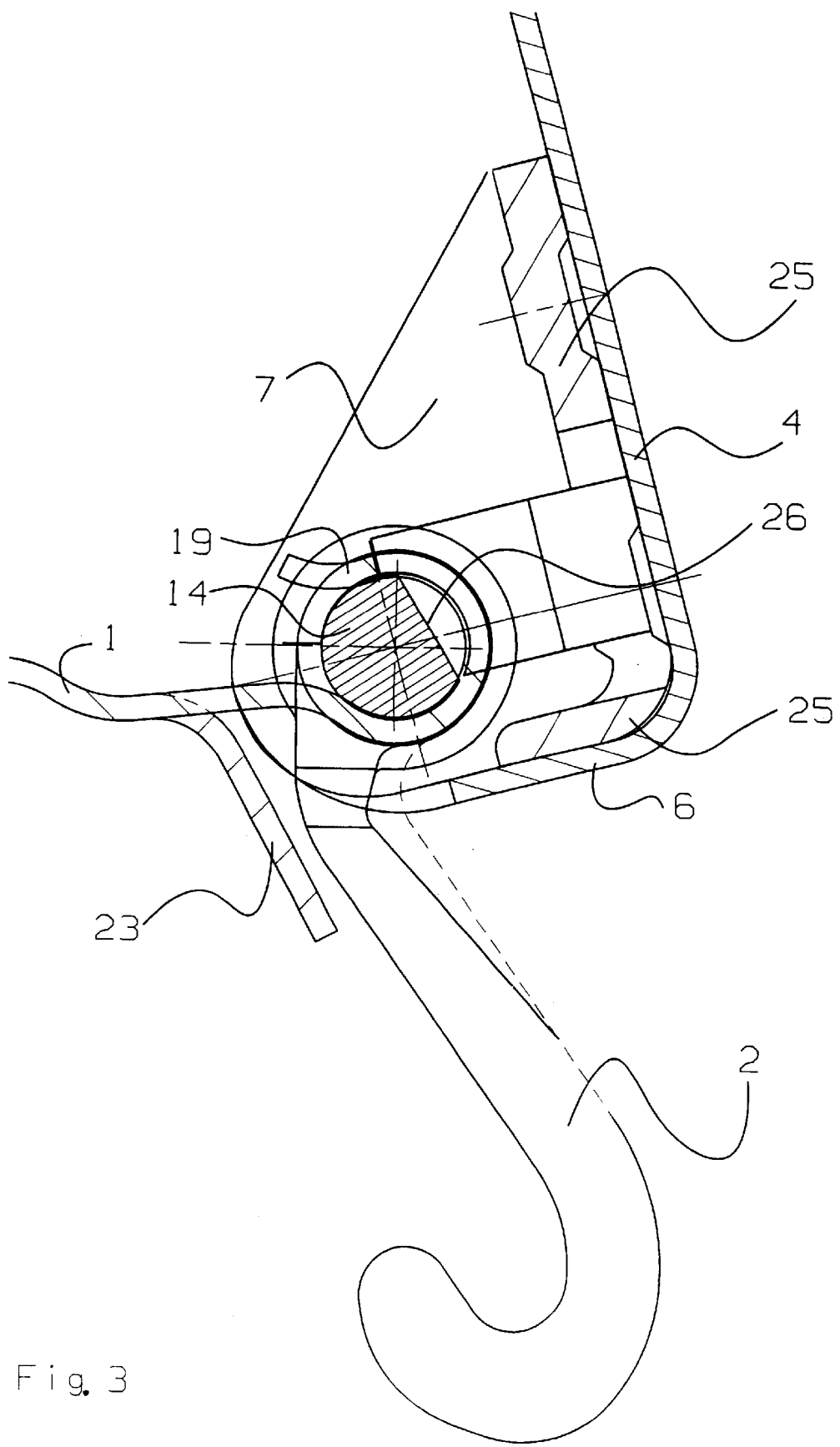
FIG. 3 is a sectional view of the hinge connection according to FIG. 1 taken along the section line A—A of FIG. 2.

Straps 23, which are bent downward and are shown in greater detail in FIG. 3, are made in one piece with the rear container edge 1 between the tongues 19.

Figure 2:
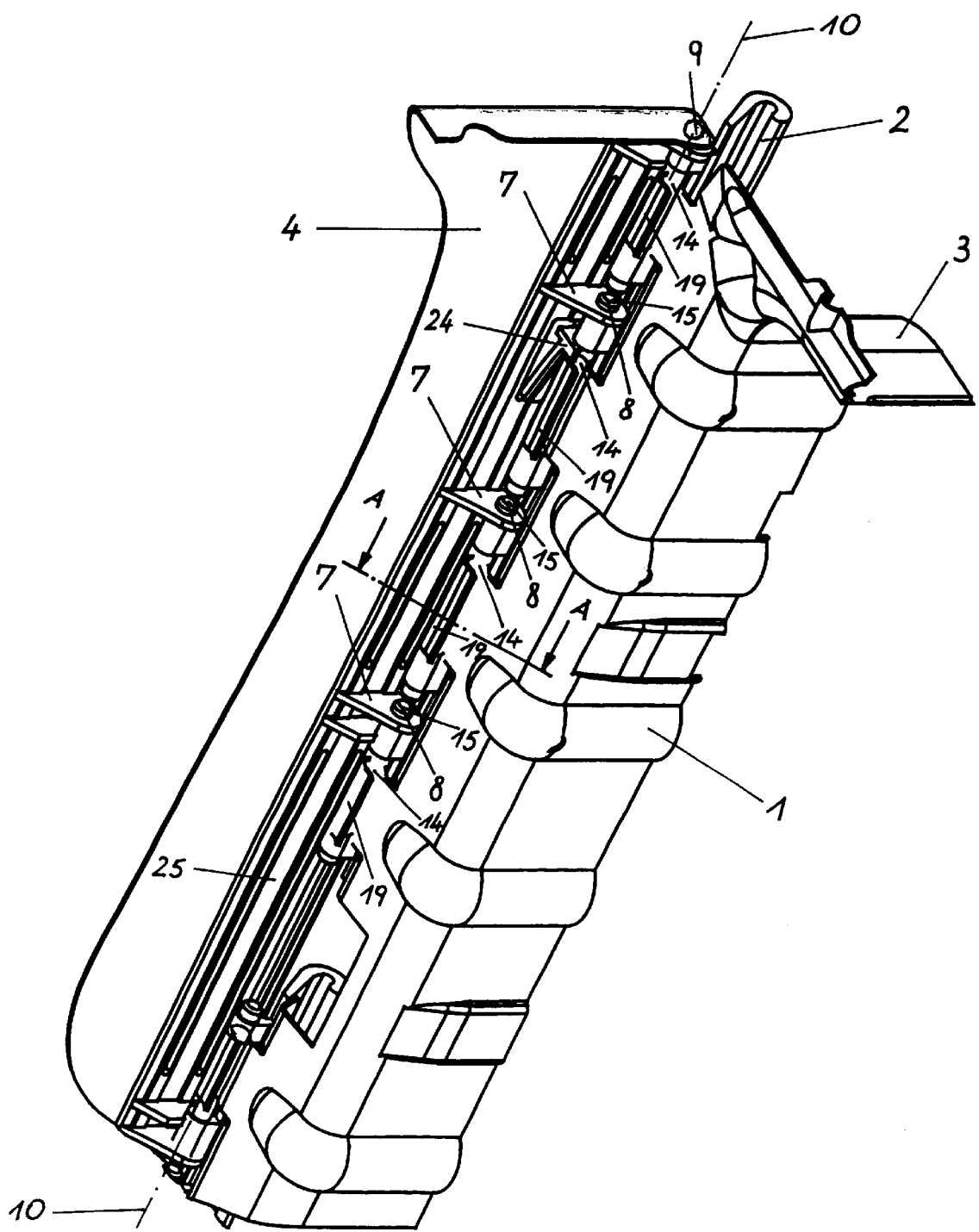
FIG. 2 is a schematic perspective view of the hinge connection according to FIG. 1 in the mounted state.

FIG. 2 illustrates the hinge connection between the container door 4, the rail section 2 and the rear container edge 1 in the mounted state. Identical components are provided with the same reference numbers as in FIG. 1. The hinge axis 10 extends in FIG. 2 flush with the holes 8, 9, the projections 15 and the hinge pins 14. In addition to the hinge elements 7, a locking element 24, which is shown only schematically in FIG. 2 and engages the rail section 2 in the area of one of the hinge pins 14 and fixes the rail section 2 axially in relation to the hinge element 7 of the container door, is arranged on the inner wall of the container door 4. The projections 15 are prevented by the locking element 24 from sliding out of the holes 8, 9. FIG. 3 shows a sectional view of the hinge connection according to FIG. 2 along the section line A—A. Identical components are designated by the same reference numbers as in FIGS. 1 and 2. FIG. 3 shows additional details of the present invention. Thus, the hinge elements 7 are made in one piece with a hinge strip 25, which extends along the door edge 6 of the container door. The hinge elements 7 and also the locking element 24 can thus be connected to the inner surface of the container door 4 in an especially simple manner by the hinge strip 25 being inserted into the connection area between the door edge 6 and the container door 4 and then bonded to the container door 4. The hinge pins 14 are provided with a flattened area 26 over their entire length so that they can be pushed into the tongues 19 in a simpler manner due to the cross section reduction caused by the flattened area 26. The straps 23, arranged bent downward, are used to prevent light from passing into the interior space of the container lower part 3.

While a specific embodiment of the invention has been shown and described in detail to illustrate the application of the principles of the invention, it will be understood that the invention may be embodied otherwise without departing from such principles.

What is claimed is:

1. An airplane breathing gas supply unit with a hinge connection, the unit comprising:

a container lower part having a rear container edge with curved tongues;

a rail section located at said rear container edge, said rail section having hinge pins defining an axially extending hinge axis and insertion openings made in one piece on a side of said rail section, said hinge pins and said insertion openings being arranged such that said hinge pins can be inserted into a curve of said tongues at said rear container edge and can be pivoted along said axially extending hinge axis, said rail section includes a projection which extends as a pin in a direction of said hinge axis; and a container door which is fastened to said projection of said rail section, pivotably around said axis, at said rear container edge of said container lower part.

2. The unit in accordance with claim 1, further comprising:
 a plurality of additional projections extending from said rail section in said direction of said hinge axis, two of said additional projections being provided opposite each other between adjacent said hinge pins and defining an insertion gap between opposite said projections.

3. The unit in accordance with claim 2, wherein said container door has individual hinge elements extending along said hinge axis, said hinge elements including structure for connection to said projections.

4. The unit in accordance with claim 3, wherein said hinge elements define holes arranged along said hinge axis.

5. The unit in accordance with claim 4, wherein an axial length of said hinge pins and a width of corresponding said tongues are selected to be such that said projections can be introduced into said holes by axially displacing said rail section.

6. The unit in accordance with claim 3, wherein said hinge elements are arranged at a hinge strip extending along an inner side of said container door.

7. The unit in accordance with claim 1, wherein said hinge pins are provided with a flattened area at least in an area adjacent said tongues.

8. The unit in accordance with claim 7, further comprising a locking element engaging said rail section in an area of said hinge pins, said locking element being disposed on an inner side of said container door.

9. The unit in accordance with claim 8, wherein a hinge strip extends along an inner side of said container door, said locking element being made in one piece with said hinge strip.

10. A hinge connection at a container of a breathing gas supply unit in an airplane between a container lower part and a container door, the hinge connection comprising:
 curved tongues provided on the container lower part at a rear container edge;
 a rail section located at said rear container edge, said rail section having hinge pins defining an axially extending hinge axis and insertion openings made in one piece with a side of said rail section and arranged such that said hinge pins can be inserted into a curve of said tongues at said rear container edge and can be pivoted along said axially extending hinge axis, said rail section includes at least one projection which extends in a direction of said hinge axis, the container door being fastened to said rail section, pivotably around said axis, at said rear container edge of said container lower part.

11. The hinge connection in accordance with claim 10, further comprising a plurality of said projections extending from said rail section, two of said projections being provided opposite each other between said adjacent clamps and defining an insertion gap between opposite said projections.

12. The hinge connection in accordance with claim 11, wherein said container door has individual hinge elements extending along said hinge axis, said hinge elements including structure for connection to said projections.

13. The hinge connection in accordance with claim 12, wherein said hinge elements define holes arranged along said hinge axis.

14. The hinge connection in accordance with claim 13, wherein an axial length of said hinge pins and a width of corresponding said tongues are selected to be such that said projections can be introduced into said holes by axially displacing said rail section.

15. The hinge connection in accordance with claim 12, wherein said hinge elements are arranged at a hinge strip extending along an inner side of said container door.

16. The hinge connection in accordance with claim 10, wherein said hinge pins are provided with a flattened area at least in an area adjacent said tongues.

17. The hinge connection in accordance with claim 16, further comprising a locking element engaging said rail section in an area of said hinge pins, said locking element being disposed on an inner side of said container door.

18. The hinge connection in accordance with claim 17, wherein a hinge strip extends along an inner side of said container door, said locking element being made in one piece with said hinge strip.

19. An airplane breathing gas supply unit with a hinge connection, the unit comprising:
 a container wall having a container edge with curved tongues;
 a rail section located at said container edge, said rail section having a plurality of hinge pins defining a hinge axis, said rail section defining a plurality of insertion openings, said hinge pins and said insertion openings being shaped for said hinge pins to be insertable into a curve of said tongues of said container edge and for pivoting along said hinge axis, said rail section including a pin shaped projection which extends in a direction of said hinge axis, and
 a container door which is pivotably fastened to said projection around said hinge axis at said container edge of said container wall.

20. The hinge connection in accordance with claim 19, wherein:
 said rail section includes a portion for connecting to a support structure for the gas supply unit.

* * * * *